(12) United States Patent
Chung

(10) Patent No.: US 6,900,386 B2
(45) Date of Patent: May 31, 2005

(54) END PLATE FOR SWITCH BOX FOR INTERIOR MOUNT ON WALL SURFACE

(76) Inventor: Charles N. Chung, 9726 E. Rush St., South El Monte, CA (US) 91733

( * ) Notice: Subject to any disclaimer, the term of this patent is extended or adjusted under 35 U.S.C. 154(b) by 61 days.

(21) Appl. No.: 10/464,995

(22) Filed: Jun. 20, 2003

(65) Prior Publication Data

US 2004/0257751 A1 Dec. 23, 2004

(51) Int. Cl.[7] .............................. H01H 9/02; B65D 6/28; H01R 13/46; H02G 3/08
(52) U.S. Cl. .............................. 174/48; 174/50; 174/58; 220/4.02; 361/643
(58) Field of Search .......................... 174/48, 50, 52.1, 174/53, 54, 57, 58, 61–63; 200/293–307; 220/3.7–3.9, 4.02; 361/643; 335/202

(56) References Cited

U.S. PATENT DOCUMENTS

| | | | | |
|---|---|---|---|---|
| 3,465,914 A | * | 9/1969 | Pierson, Jr. .................. 174/50 |
| 3,952,142 A | * | 4/1976 | Weiss ........................ 174/52.1 |
| 4,947,461 A | * | 8/1990 | Yoshioka et al. .... 200/302.1 X |
| 5,132,653 A | * | 7/1992 | Nakatake et al. ....... 200/293 X |
| 5,448,011 A | * | 9/1995 | Laughlin ..................... 174/48 |
| 6,232,553 B1 | * | 5/2001 | Regen ......................... 174/64 |
| 6,259,023 B1 | * | 7/2001 | Reiker ......................... 174/60 |

* cited by examiner

Primary Examiner—James R. Scott
(74) Attorney, Agent, or Firm—Raymond Y. Chan; David and Raymond

(57) ABSTRACT

An end plate includes a plate member having a main flange extended from a front edge thereof for biasing against a front side of a mounting surface and a guider slot provided on the plate member for communicating an interior of a switch box to outside, and a side cover, which is overlapped on the plate member, including a holding catch extended from an edge of the side cover to mount on the plate member. A side locker includes a side flange for facing towards the rear side of the mounting surface and a driving axle connected to the holding catch of the side cover to drive the side flange towards to the main flange for biasing against the rear side of the mounting surface. Therefore, the wall is sandwiched between the main flange and the side flange to rigidly support the switch box on the mounting surface.

16 Claims, 4 Drawing Sheets

END PLATE FOR SWITCH BOX FOR INTERIOR MOUNT ON WALL SURFACE

BACKGROUND OF THE PRESENT INVENTION

1. Field of Invention

The present invention relates to switch box, and more particularly to an end plate for switch box for interior mount on wall surface, wherein the end plate is adapted for applying a pressing force on the same wall surface where the switch box mounted thereon, so as to evenly distribute the pressing force on the wall surface to prevent the damage of the wall surface from being over screwing.

2. Description of Related Arts

Conventionally, there are two types of a switch box for receiving a switch assembly therein, which are an exterior switch box mounted on a wall surface and an interior switch box hiddenly mounted behind the wall surface. Due to the aesthetic appearance, the interior type of the switch box is mostly used in home and office that the switch box cannot be seen obviously.

Referring to FIG. 1, the switch box comprises a pair of upper and lower main flanges A1 for mounting on a top and bottom of the wall surface. The switch box comprises a pair of end plates A2 each having an adjustable side flange A21 mounted on two side ends of the switch box for protecting a switch assembly received in the switch box. Each adjustable side flange A21 is adapted for sidewardly mounting on the wall surface from behind.

However, the side flanges A21 and the main flanges A1 are not mounted on the same plane of the wall surface such that different pressing forces applied by the side flanges A21 and the main flanges A1 are forced on the wall surface. Due to the uneven pressing forces distributed on the wall surface, the structure of the wall surface will be destroyed, especially by over screwing the side flanges A21. Since the wall surface cannot be repaired after construction, the damaged wall surface will not rigidly support the switch box.

SUMMARY OF THE PRESENT INVENTION

A main object of the present invention is to provide an end plate for switch box for interior mount on wall surface, wherein the main flange and the side flange are biased against the same wall surface so as to prevent an uneven pressing force applied on the wall surface to destroy the wall surface.

Another object of the present invention is to provide an end plate for switch box for interior mount on wall surface, wherein the side flange is adjustably mounted on the same wall surface from behind, so as to prevent the side flange from over screwing.

Another object of the present invention is to provide an end plate for switch box for interior mount on the wall surface, wherein the switch box is adapted for rigidly supporting on the wall surface.

Another object of the present invention is to provide an end plate for switch box for interior mount on wall surface, wherein the end plate does not require to alter the original structural design of the switch box, so as to minimize the manufacturing cost of incorporating the end plate with the switch box.

Accordingly, in order to accomplish the above objects, the present invention provides an end plate for switch box for interior mount on a mounting surface having a front side and rear side, comprising:

a plate member having at least a main flange perpendicularly and outwardly extended from a front edge of the plate member for biasing against the front side of the mounting surface, and a guider slot provided on the plate member for communicate an interior of the switch box to outside;

a side cover, which is overlapped on the plate member to cover the guider slot, comprising a holding catch extended from an end edge of the side cover to mount on the plate member so as to hold the side cover in position; and a side locker comprises a side flange arranged for facing towards the rear side of the mounting surface and a driving axle rotatably connected to the holding catch of the side cover to drive the side flange towards to the main flange for biasing against the rear side of the mounting surface, thereby, the wall is securely sandwiched between the main flange and the side flange so as to rigidly support the switch box on the mounting surface.

These and other objectives, features, and advantages of the present invention will become apparent from the following detailed description, the accompanying drawings, and the appended claims.

DETAILED DESCRIPTION OF THE PREFERRED EMBODIMENT

Figure 1:
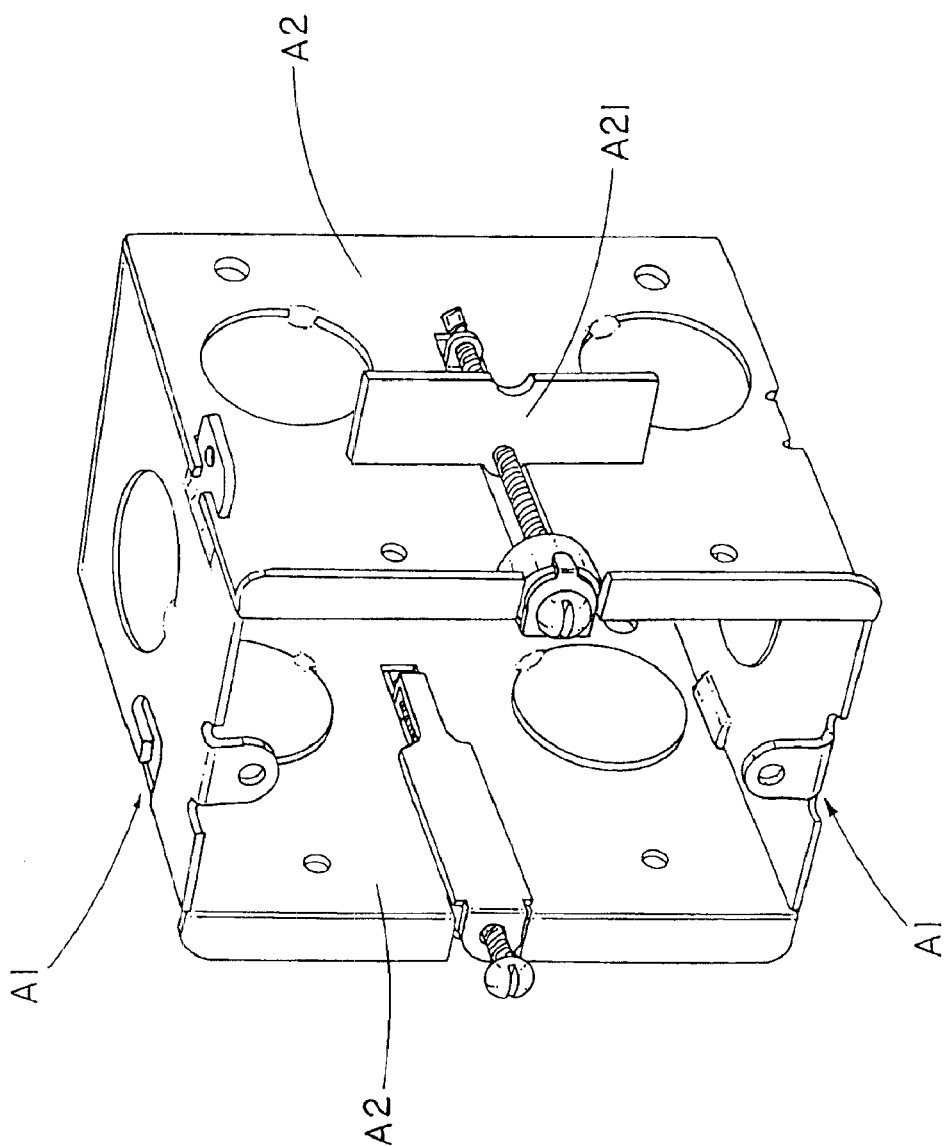
FIG. 1 is a perspective view of a conventional end plate for switch box.
Figure 2:
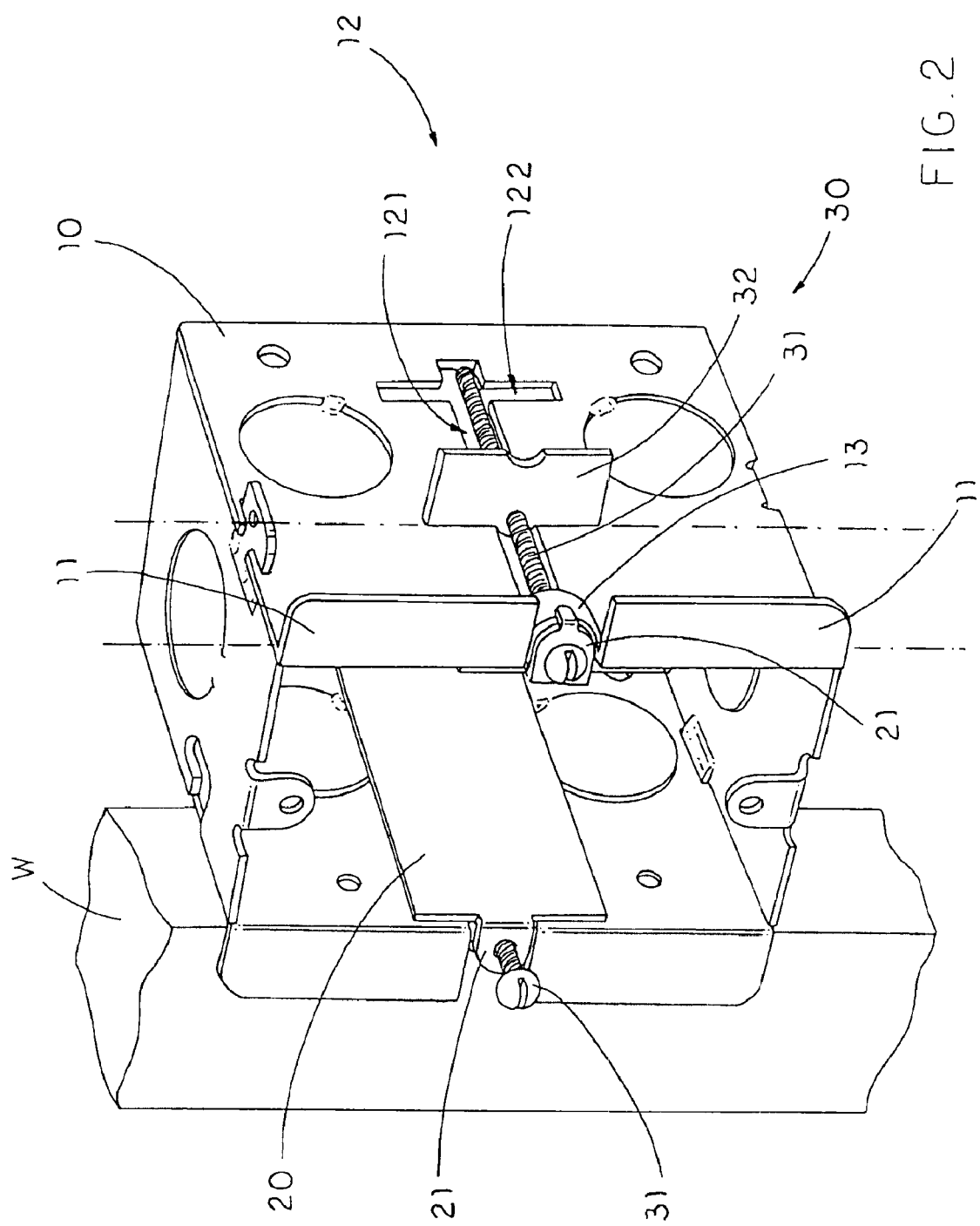
FIG. 2 is a perspective view of an end plate mounted on a switch box according to a preferred embodiment of the present invention.
Figure 3:
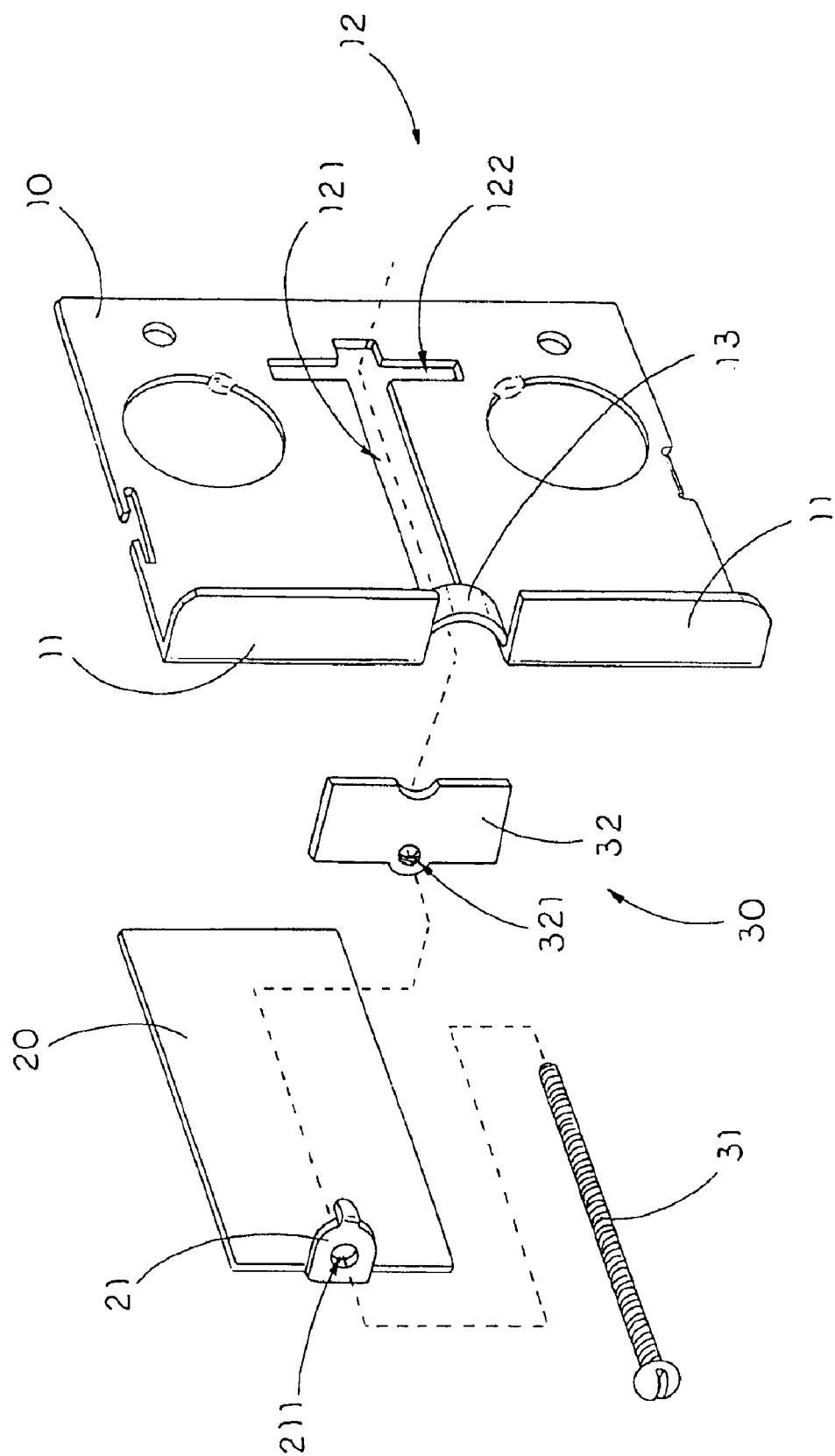
FIG. 3 is an exploded perspective view of an end plate for switch box for interior mount on wall surface according to the above preferred embodiment of the present invention.

Referring to FIGS. 2 and 3 of the drawings, an end plate for switch box 1 for interior mount on mounting surface W according to a preferred embodiment of the present invention is illustrated, wherein the end plate is adapted for mounting on a side end of the switch box 1 for protecting a switch assembly 2 received therein.

Accordingly, the end plate is arranged to mount the switch box on the mounting surface, such as a wall or a supporting beam, having a front side and a rear side. The end plate comprises a plate member 10, a side cover 20, and a side locker 30.

The plate member 10, which is arranged for mounting on the side end of the switch box 1, has at least a main flange 11 perpendicularly and outwardly extended from a front edge of the plate member 10 for biasing against the front side of the wall, and a guider slot 12 provided on the plate member for communicate an interior of the switch box 1 to outside.

According to the preferred embodiment, there are two main flanges 11 perpendicularly and outwardly extended from a front edge of the end plate 10 for biasing against the front side of the mounting surface W when the switch box 1 is mounted on the mounting surface W. In other words, the two main flanges 11 are adapted for applying an inward pressing force on the front side of the mounting surface W to support the switch box 1 on the mounting surface W.

The guider slot 12 is an elongated through slot formed on a mid-portion of the plate member 10, which is positioned between the two main flanges 11, to communicate an interior of the switch box 1 to outside wherein the guider slot 12, having a T-shaped, has a longitudinal head portion 121 and a vertical tail portion 122.

The side cover 20, having a predetermined size, is disposed in the interior of the switch box 1 to overlapped on the plate member 10 so as to cover the guider slot 12 for preventing dust and dirt from entering into the interior of the switch box 1. The side cover 20 comprises a holding catch 21 outwardly extended from a front edge of the side cover 20 for hanging on the front edge of the end plate 10, so as to hold the side cover 20 on an interior surface of the plate member 10 in position.

Figure 4:
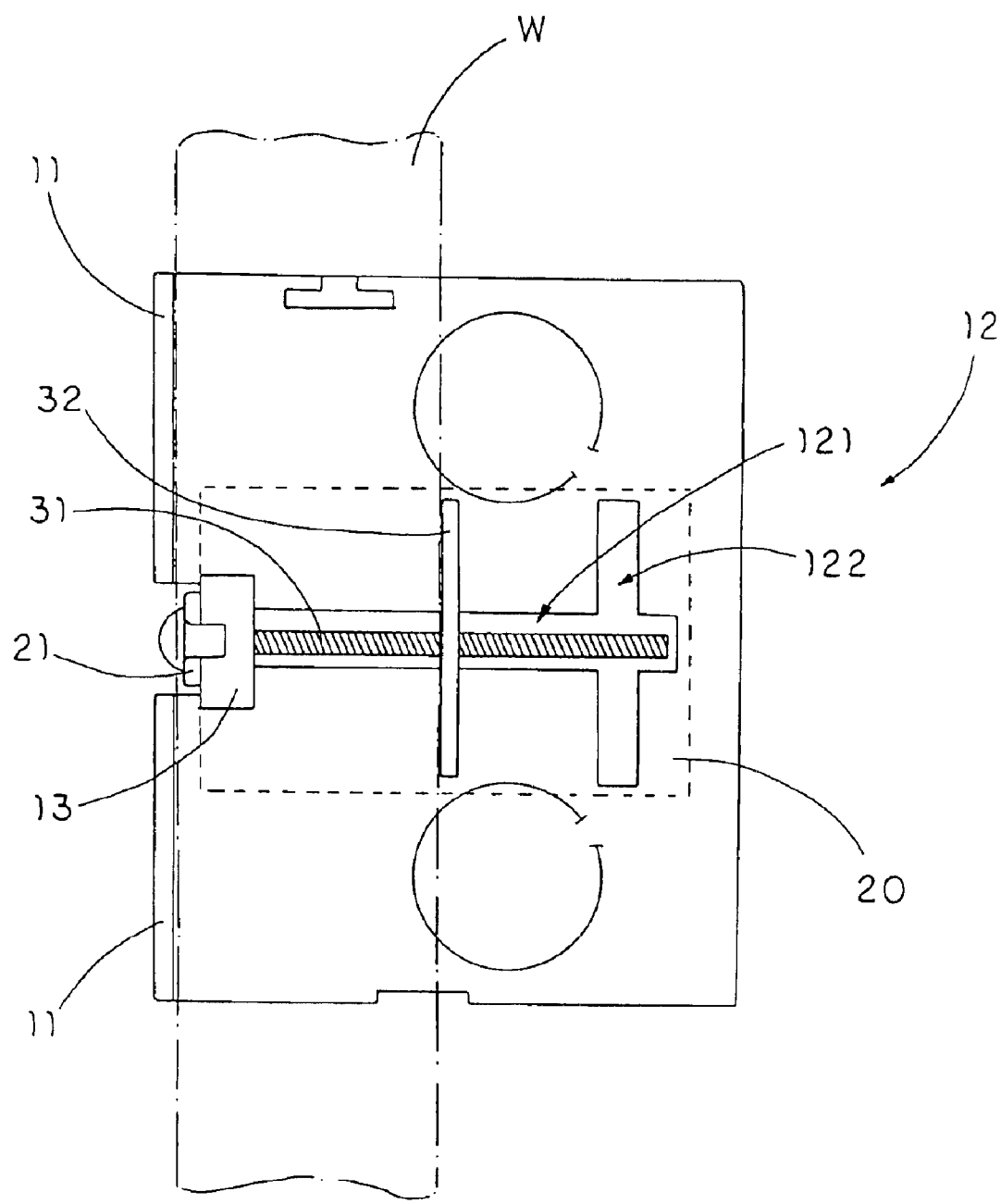
FIG. 4 is sectional view of the end plate for switch box for interior mount on wall surface according to the above preferred embodiment of the present invention.

The side locker 30 comprises a side flange 32 arranged for facing towards the rear side of the mounting surface W and a driving axle 31 rotatably connected to the holding catch 21 of the side cover 20 to drive the side flange 32 towards to the main flange 11 for biasing against the rear side of the mounting surface W. Therefore, the mounting surface W is securely sandwiched between the main flange 11 and the side flange 32 so as to rigidly support the switch box 1 on the mounting surface W, as shown in FIG. 4.

The plate member 10 further comprises a mounting bridge 13 formed at an opening end of the guider slot 12 to engage with the holding catch 21 of the side cover 20 so as to align the side locker 30 with the guider slot 12. In other words, when the side cover 20 is overlapped on the plate member 10 to engage the holding catch 21 with the mounting bridge 13, the driving axle 31 is aligned with the longitudinal head portion 121 of the guider slot 12 while the side flange 32 is aligned with the vertical tail portion 122 of the guider slot 12.

As shown in FIG. 3, the guider slot 12 is sized and shaped to allow the driving axle 31 passing through the longitudinal head portion 121 and the side flange 32 passing through the vertical tail portion 122 such that the side locker 30 is arranged to pass through the guider slot 12 to locate the side flange 32 towards the rear side of the mounting surface W.

Accordingly, the side locker 30 is adapted for adjustably locking the switch box 1 on the mounting surface W. The mounting surface W, having a predetermined thickness preferably from 5/8 inch to 1¼ inches, is capably of adjustably being sandwiched by the main flanges 11 and the side flange 32 so as to rigidly support the switch box 1 on the mounting surface W.

According to preferred embodiment, the driving axle 31 is an elongated turning screw longitudinally extended on an exterior surface of the end plate 10 wherein the holding catch 21 of the side cover 20 has a through hole 211 for the driving axle 31 slidably penetrating therethrough. The driving axle 31 has a length larger than the thickness of the mounting surface W such that the side flange 32 can be arranged to bias against the rear side of the mounting surface W. Furthermore, the side flange 32 has a screw hole 321 formed thereon, which is aligning with the through hole 211 of the holding catch 21, wherein a rear end of the driving axle 31 is rotatably inserted into a screw hole 321 in such a manner by turning the driving axle 31, the side flange 32 is adapted for moving along the driving axle 31 to apply an outward pressing force on the rear side of the mounting surface W, so as to selectively adjust a distance between the main flanges 11 and the side flange 32.

The driving axle 31 and the side flange 32 of the side locker 30 are adapted for fittedly passing through the longitudinal head portion 121 and the vertical tail portion 122 of the guider slot 12 respectively in such a manner that the side locker 30 is capable of moving from the interior of the switch box 1 to the exterior thereof through the guider slot 12. It is worth to mention that a length of the longitudinal head portion 121 of the guider slot 12 must be at least the same length of the driving axle 31 such that the driving axle 31 is capably of moving from the interior of the switch box to the exterior thereof through the guider slot 12.

In order to mount the switch box 1 on the mounting surface W, the side locker 30 should be positioned inside the switch box 1. The switch box 1 is then embedded into the mounting surface W until the main flanges 11 are biased against the front side of the mounting surface W in order to apply the inward pressing force on the front side of the mounting surface W. Then, the side locker 30 is adapted to move from the interior of the switch box 1 to the exterior thereof through the guider slot 12 wherein the side flange 32 is positioned behind the mounting surface W. By turning the driving axle 31, the side flange 32 is moving towards a rear side of the mounting surface W until the side flange 32 is biased the rear side of the mounting surface W for applying the outward pressing force on the mounting surface W. So, the mounting surface W is securely sandwiched between the main flange 11 and the side flange 32 by the inward pressing force and the outward pressing force respectively, so as to rigidly mount the switch box 1 on the mounting surface W.

Since the main flanges 11 and the side flange 32 are biased against the same mounting surface W, the inward and outward pressing forces applied by the main flanges 11 and the side flange 32 respectively are evenly distributed on the mounting surface W so that the mounting surface W will not be destroyed by over screwing. Thus, the mounting surface W is sandwiched between the main flanges 11 and the side flange 32, no screw is needed to penetrate through the wall surface W, which will damage the structure of the mounting surface W.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure form such principles. Therefore, this invention includes all modifications encompassed within the spirit and scope of the following claims.

What is claimed is:

1. An end plate for mounting on a side end of a switch box for interior mount on a mounting surface having a front side and a rear side, comprising:

a plate member, which is arranged for mounting on said side end of said switch box, having at least a main flange perpendicularly and outwardly extended from a front edge of said plate member for biasing against said front side of said mounting surface, and a guider slot provided on said plate member for communicating an interior of said switch box to outside;

a side cover, which is overlapped on said plate member, comprising a holding catch extended from an edge of the side cover to mount on said plate member so as to hold said side cover in position; and a side locker comprises a side flange arranged for facing towards said rear side of said mounting surface and a driving axle rotatably connected to said holding catch of said side cover to drive said side flange towards to said main flange for biasing against said rear side of said mounting surface, thereby, said mounting surface is securely sandwiched between said main flange and said side flange so as to rigidly support said switch box on said mounting surface.

2. The end plate, as recited in claim 1, wherein said side cover, has a predetermined size, is overlapped on said plate member to cover said guider slot for preventing dust and dirt from entering into said switch box through said guider slot.

3. The end plate, as recited in claim 1, wherein said plate member further comprises a mounting bridge formed at an opening end of said guider slot to engage with said holding catch of said side cover so as to align said side locker with said guider slot.

4. The end plate, as recited in claim 1, wherein said driving axle has a length larger than a thickness of said mounting surface in order to drive said side flange to bias against said rear side of said mounting surface.

5. The end plate, as recited in claim 1, wherein two screw holes are formed on said holding catch and said side flange respectively, said driving axle comprises an elongated turning screw rotatably inserted into said two screw holes in such a manner that by turning said driving axle, said side flange is slidably moved along said driving axle to selectively adjust a distance between said main flanges and said side flange for sandwiching said mounting surface therebetween.

6. The end plate, as recited in claim 5, wherein said side cover, has a predetermined size, is overlapped on said plate member to cover said guider slot for preventing dust and dirt from entering into said switch box through said guider slot.

7. The end plate, as recited in claim 1, wherein said guider slot, which is T-shaped, has a longitudinal head portion and a vertical tail portion, wherein said guider slot is sized and shaped to allow said driving axle and said side flange passing through said longitudinal head portion and said vertical tail portion of said guider slot respectively.

8. The end plate, as recited in claim 7, wherein said side cover, has a predetermined size, is overlapped on said plate member to cover said guider slot for preventing dust and dirt from entering into said switch box through said guider slot.

9. The end plate, as recited in claim 7, wherein said plate member further comprises a mounting bridge formed at an opening end of said guider slot to engage with said holding catch of said side cover so as to align said side locker with said guider slot.

10. The end plate, as recited in claim 7, wherein two screw holes are formed on said holding catch and said side flange respectively, wherein said driving axle comprises an elongated turning screw rotatably inserted into said two screw holes in such a manner that by turning said driving axle, said side flange is slidably moved along said driving axle to selectively adjust a distance between said main flanges and said side flange for sandwiching said mounting surface therebetween.

11. The end plate, as recited in claim 10, wherein said plate member further comprises a mounting bridge formed at an opening end of said guider slot to engage with said holding catch of said side cover so as to align said side locker with said guider slot.

12. The end plate, as recited in claim 10, wherein said driving axle has a length larger than a thickness of said mounting surface in order to drive said side flange to bias against said rear side of said mounting surface.

13. The end plate, as recited in claim 10, wherein said side cover, has a predetermined size, is overlapped on said plate member to cover said guider slot for preventing dust and dirt from entering into said switch box through said guider slot.

14. The end plate, as recited in claim 13, wherein said driving axle has a length larger than a thickness of said mounting surface in order to drive said side flange to bias against said rear side of said mounting surface.

15. The end plate, as recited in claim 13, wherein said plate member further comprises a mounting bridge formed at an opening end of said guider slot to engage with said holding catch of said side cover so as to align said side locker with said guider slot.

16. The end plate, as recited in claim 15, wherein said driving axle has a length larger than a thickness of said mounting surface in order to drive said side flange to bias against said rear side of said mounting surface.

* * * * *